L. TAUSSIG.
VEHICLE FRAME.
APPLICATION FILED DEC. 29, 1917.
1,312,648.
Patented Aug. 12, 1919.
2 SHEETS—SHEET 1.
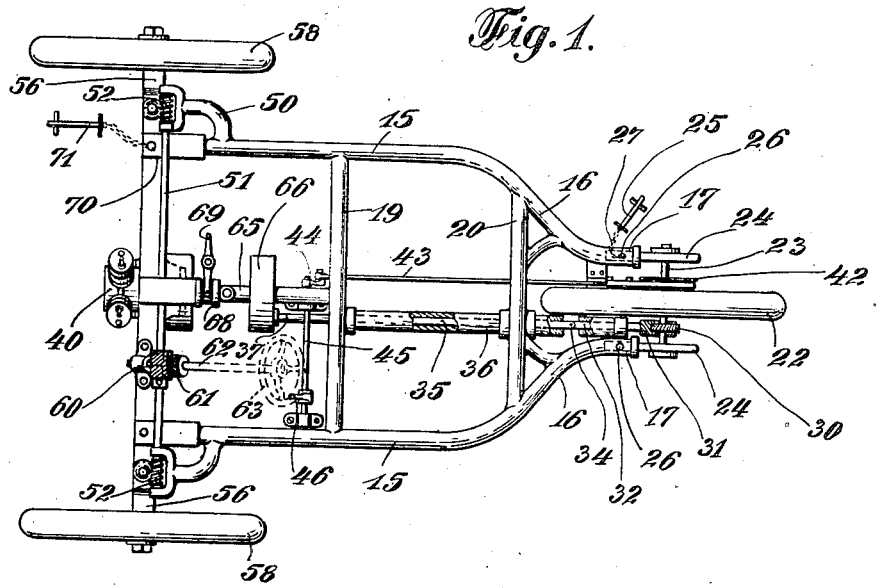
Inventor
Leo Taussig
By his Attorney

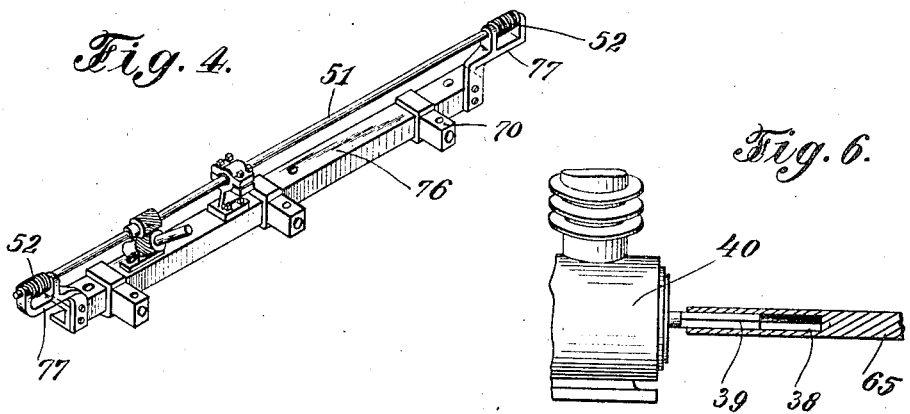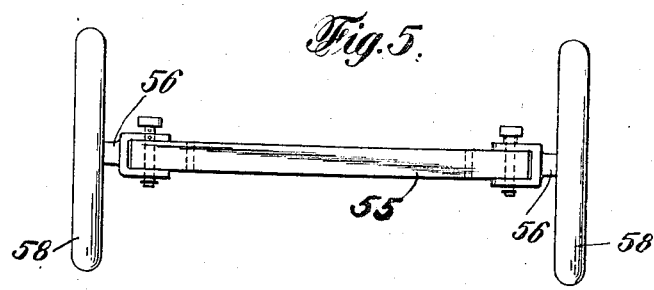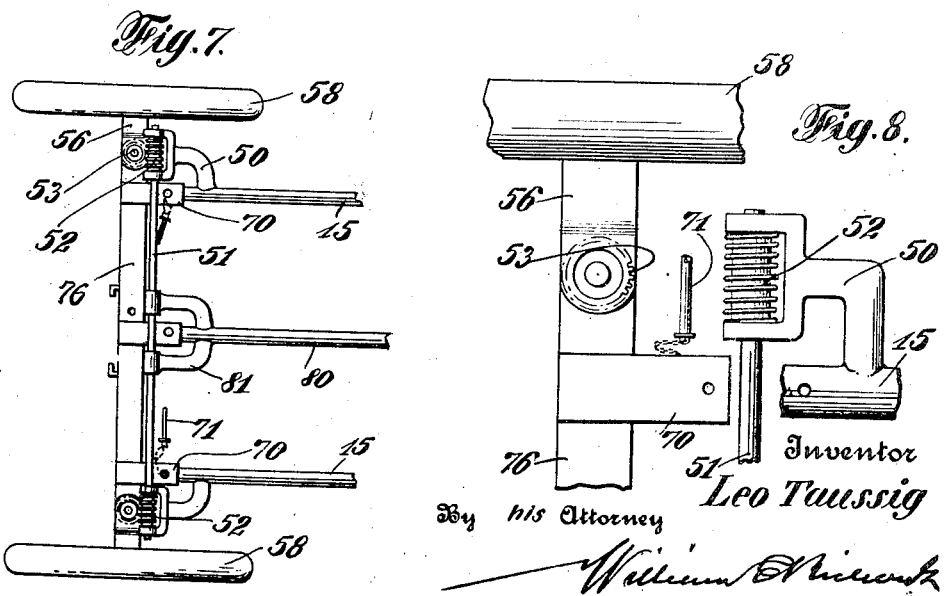

UNITED STATES PATENT OFFICE.

LEO TAUSSIG, OF NEW YORK, N. Y.

VEHICLE-FRAME.

1,312,648.  Specification of Letters Patent.  Patented Aug. 12, 1919.

Application filed December 29, 1917. Serial No. 209,557.

*To all whom it may concern:*

Be it known that I, LEO TAUSSIG, a citizen of the United States, residing at New York, in the county and State of New York, have invented a certain new and useful Improvement in Vehicle-Frames, of which the following is a specification.

This invention relates to improvements in vehicle frames, and has as its principal object the provision of a frame comprised of separate sections which may be quickly and conveniently assembled and as readily dismounted, so that the same can be folded compactly for transportation.

A further object is to so arrange the front wheels that both may be turned in a plane parallel to their axle, forming an independent section which may be placed closely adjacent to the main frame, while the rear wheel may be removed from the frame and placed alongside the other sections.

A still further object is to provide means whereby the frame may be assembled or dismounted without the use of any tools or appliances whatever.

These and other like objects are attained by the novel construction and combination of parts hereinafter described and shown in the accompanying drawings, forming a material part of this disclosure, and in which:

Figure 1 is a top plan view showing a vehicle frame, made in accordance with the invention;

Fig. 2 is a front elevational view of the same showing a modified form of connection between the frame and front axle;

Fig. 3 is a top plan view of the front section, in dismounted position;

Fig. 4 is a perspective view showing a modified form of front support and indicating the arrangement of steering gear;

Fig. 5 is a front elevational view showing the front wheels and axle;

Fig. 6 is a fragmental partial perspective and sectional view illustrating the motor and driving shaft engaged thereto;

Fig. 7 is a fragmental top plan view showing the front of a modified form of frame in an assembled position; and, Fig. 8 is an enlarged fragmental top plan view of the same, showing a still further modification of frame assembly.

The main portion of the truck frame is composed of a pair of tubular bars 15, the same being arranged in parallel, and having their rearwardly extending ends curved inward toward each other, as at 16, terminating in parallel rear ends 17.

Engaged between the elements 15 and 16, are braces, respectively 19 and 20, the same being rigidly united so as to form a stable structure. A rear wheel 22 is mounted upon an axle 23, carried in bearings 24, the inner ends of which are engageable within the tubular frame 17 and secured therein by means of cotter pins 25, which pass through openings 26, formed respectively in the ends of the frame elements and the ends of the axle brackets. These pins are secured by chains 27 preventing their loss when in a dismounted position.

Also engaged with the shaft 23 is a spiral driving gear 30, driven by a pinion 31, fixed on the end of a shaft 32, mounted in bearings 33, the shaft having a universal joint 34, engageable with the front section 35, carried in a bearing 36 extending between the braces 19 and 20. At the extreme front end of the shaft is a pinion 37, engaging in an internal gear 66 fixed on a sliding shaft 65, having a rectangular opening 38 receptive of a similar shaped stem 39, extending outward from the motor 40, at the extreme front end of the vehicle frame.

A brake 42 is mounted upon the shaft 23, the same being operated through a rod 43, attached to a bell-crank 44, actuated by the transverse shaft 45 upon which is a foot pedal 46. Formed with the front end of the frame bars 15 are forked brackets 50, in which is journaled a shaft 51, having near its ends and carried between the forks of the brackets, worms 52, engageable with worm gears 53 mounted upon vertical axes in the front axle 55, with which is engaged the wheel carrying pivoted spindles 56, so that the front wheels 58 may be steered in any given direction.

The shaft 51 is turned by reason of a spiral gear 60, through a meshing gear 61, operated by the shaft 62 and steering wheel 63 as is common.

In Fig. 1 the shaft 35 is shown to be offset from the motor shaft 65 and driven through an internal gearing 66 the same meshing with the pinion 37. On the end of the shaft 65, is a clutch 68, operated by the lever 69, so that the driving wheel 22 can be disengaged from the motor at any desired interval.

In this figure the front ends of the side bars 15 enter openings formed in forked projections 70 secured to the ends of said bars and adapted to partially surround the axle 55, said projections being secured to said axles by pins 71 passing through openings in such manner that they can be disengaged therefrom.

In Figs. 2 and 4 a modification is shown in which the front ends of the side bars 15, are engaged with projections 70 extending from a channel shaped casing 76 upon which brackets 77 are engaged by cotter pins 71 in suitable openings passing through the bars 15 and casing 76. The casing 76 is substantially of U shape, and is adapted to be slipped over the front axle 55 in the manner of a sleeve, and to cover and surround the said axle upon three sides thereof. Extending, to the front, from the brace 19, is a third or central bar 80, having at the front end, brackets 81 in which the shaft 51 is journaled, the construction in other respects being similar to that formerly described.

From the foregoing it will be seen that the several sections comprising the entire frame, may be readily dismounted or assembled by the use of cotter pins, and the frame and front section, including the steering wheels, together with the rear wheel, can be placed closely adjacent, side by side, so as to form a structure well adapted to be crated for transportation as may be desired, and it will also be obvious that in contradistinction to the usual type of vehicles, a single wheel is at the rear, while the front wheels may be steered in any direction. Features are indicated, by means of which power may be applied by the lever 69, and the vehicle may be stopped by operating the brake 46, as is customary in high grade vehicles of the class described.

Having thus described my invention what I claim as new and desire to secure by Letters Patent, is:—

1. In a vehicle, a main frame carrying the driving mechanism of the vehicle, a front frame provided with dirigible wheels having steering elements, a driving wheel carried by said main frame, means for actuating said steering elements and removable connections between said main and front frames and said driving wheel whereby said parts may be disconnected.

2. In a vehicle, a main frame, a front frame having dirigible steering wheels attached thereto, steering elements attached to said front frame, gears secured to the spindles of said steering wheels and adapted to engage said steering elements, a driving wheel, and removable connections between said main and front frames and said driving wheel, whereby said parts may be disconnected.

3. In a vehicle, the combination with a pair of bars having their rear ends bent inwardly toward the center, a driving wheel removably engaged with said bars, a pair of front wheels, spindles upon which said wheels are journaled, a front axle hingedly engaged at the inner ends of said spindles whereby the latter may be turned to a plane parallel with said axle, and removable connections between said front axle and said frame whereby said sections may be disconnected.

4. In a vehicle, a rear driving wheel, a shaft upon which said wheel is mounted, brackets in which said shaft is journaled, a frame with which said brackets are removably engaged, a front axle having attached thereto a pair of dirigible front wheels, spindles upon which said front wheels are mounted, said axle being hingedly engaged with the inner ends of said spindles, removable conections between said axle and said frame, means for steering said dirigible wheels, a motor carried by said frame adapted to drive said rear wheel, and a shaft removably engaged with said motor so as to permit said frame to be dismounted.

5. In a vehicle frame, the combination with a pair of bars engaged in parallel and having their inner ends brought toward each other, braces extending between said bars, a driving wheel journaled between the inner ends of said bars, means for permitting said driving wheel to be removed therefrom, an axle at the front end of said bars, spindles hingedly engaged at the outer ends of said axle, wheels rotatably mounted on said spindles, means for steering said wheels, a casing engaging and partially surrounding said front axle, removable connections between said casing and said axle, and steering wheels whereby the latter may be disassociated and permitted to fold compactly.

6. In a vehicle frame a front axle, dirigible wheels connected therewith, a main frame, steering mechanism adapted to control the movements of said dirigible wheels, and removable means adapted to register said steering mechanism and to connect said axle and main frame.

7. In a vehicle frame a front axle, dirigible wheels connected therewith, a main frame, a casing upon the front of said frame adapted to engage and partially inclose said axle, and removable means for connecting said axle and casing.

8. In a vehicle frame a front axle, dirigible wheels connected therewith, a main frame, a casing upon the front of said frame adapted to engage and partially inclose said axle, steering mechanism carried by said dirigible wheels and by said casing, and removable means for connecting said axle and casing.

In testimony whereof I have signed my name to this specification this 26th day of November, 1917.

LEO TAUSSIG.